United States Patent [19]
Chiu-Hao

[11] Patent Number: 6,048,270
[45] Date of Patent: Apr. 11, 2000

[54] DATA-TRANSFER DEVICE

[76] Inventor: Cheng Chiu-Hao, No. 44, Chung Cheng Rd., Yuan Li Town, Miao Lihhsien, Taiwan

[21] Appl. No.: 09/157,361

[22] Filed: Sep. 21, 1998

[51] Int. Cl.[7] ..................................................... B41L 5/04
[52] U.S. Cl. ............................... 463/45; 463/44; 463/43; 463/1
[58] Field of Search .................................. 463/43, 44, 45, 463/39, 40, 41, 42, 1; 711/100, 101, 102, 103, 104, 105

[56] References Cited

U.S. PATENT DOCUMENTS

| | | | |
|---|---|---|---|
| Re. 35,520 | 5/1997 | Darling et al. ............................ | 463/45 |
| 5,395,112 | 3/1995 | Darling ..................................... | 463/45 |
| 5,996,033 | 9/1997 | Chiu-Hao ................................. | 463/45 |

*Primary Examiner*—Valencia Martin-Wallace
*Assistant Examiner*—Sheila Clayton
*Attorney, Agent, or Firm*—Bacon & Thomas

[57] ABSTRACT

The present invention comprises at least a serial data interface unit, a data buffer unit, a data processing unit, and a serial/parallel data interface unit. It is designed for compressing and transferring recorded data signals stored in the memory card employed by various game players currently available in the market; and acting as a data-transfer device for compressing and transferring data signals and for transmitting control signals between the specific game player and the non-specific memory card.

20 Claims, 6 Drawing Sheets

DATA-TRANSFER DEVICE

FIELD OF THE INVENTION

The present invention is related to a device for data transfer, especially to a device for transferring data between a game player for of a home-entertainment system and a memory card.

DESCRIPTION OF THE PRIOR ART

In the current market of TV game players for home-entertainment, the mainstream brand-name products are Nintendo 64 ("N-64") by Nintendo, Saturn ("SS") by Sega, and Play-Station ("PS") by Sony. The gaming software continues to upgrade to newer versions, and the gaming modes unceasingly develop various approaches, such as simulation games, strategic games, and role-playing games, which are usually designed in such a way that the players find it difficult to complete one level and go on to the next level in one setting. As such, certain data storage devices for recording the data of the game records are required to enable the player to resume the game at the point where the player had left off last time. Currently, major brand-name game players are equipped with external memory card slots to increase the memory capacities of their systems.

However, currently, each game player has its own technical specification and uses its own exclusive memory cards. The memory capacities of the memory card varies, and each is incompatible with the others. Table 1 is a list of the memory capacities of the memory cards used by the above referenced home-entertainment system makers:

TABLE 1

| System Name | N-64 | PS | SS |
| --- | --- | --- | --- |
| Memory Card Capacity (bit) | 256K | 1M | 8M |

Each maker manufactures only its own memory card with its own set of specifications and memory capacity. As a result, players are left with the option of buying more of the specific memory cards that fit particular game players as the need for storing game record data increases. The per unit cost of making memory chips has steadily declined as production technologies improve by leaps and bounds. As a result, although the memory card capacity of the SS player is 8 times that of the PS game player and 32 times that of the N-64 game player, its price is neither 8 times nor 32 times greater. Therefore, a data-transfer device ("DTD") that allows memory cards by each maker to be used in the player by the others would enable players to have the option of buying memory cartridges with higher memory capacity and no longer be subjected to the capacity limitation imposed by their particular game players.

Furthermore, as data is compressed by appropriate data-compression approaches so that more data can be stored in a given space, the efficiency of the memory card is further enhanced.

PROBLEM THIS INVENTION SEEKS TO OVERCOME

This invention seeks to overcome the problem of inconvenience and incompatibility arising from the fact that the memory cartridge made for one game player cannot be used in another player and vice versa, and to prevent each maker from monopolizing the market for memory cards for its own brand-name systems; and to enable players to purchase memory cards of the same amount of storage space with lower per-unit prices and to no longer be restricted to purchasing the same amount of storage space at higher prices.

The object of the present invention is to provide a converter that converts one memory card so that it may be used in another game player of a different specification.

Another object of the present invention is to provide for an external add-on memory enhancement by using the data-transfer device for connecting to a memory card with a higher capacity.

A further object of the present invention is to provide for a data-transfer device that enables an external add-on insertion of a non-specific memory card in a specific system unit.

An even further purpose of the present invention is to provide for a data-transfer device capable of compressing record data from the game player.

SUMMARY OF THE INVENTION

In view of the problem and inconvenience associated with the mutual incompatibility of memory cards designed for different game players, and the drawback in uncompressed data taking up larger memory spaces, the DTD of the present invention, with respect to data from the various game players to be recorded in a memory card, compresses and transfers said data, and acts as a converter between a game player of one specification and a memory card of another specification for data compression and for communication of control signals. This DTD comprises at least a serial data interface unit, a data buffer unit, a data processing unit, and a serial/parallel data interface unit.

BRIEF DESCRIPTION OF THE DRAWINGS

The many distinguished features and characteristics of this DTD can be further illustrated in the following detailed descriptions and drawings.

DESCRIPTION OF THE PREFERRED EMBODIMENT

Figure 1:
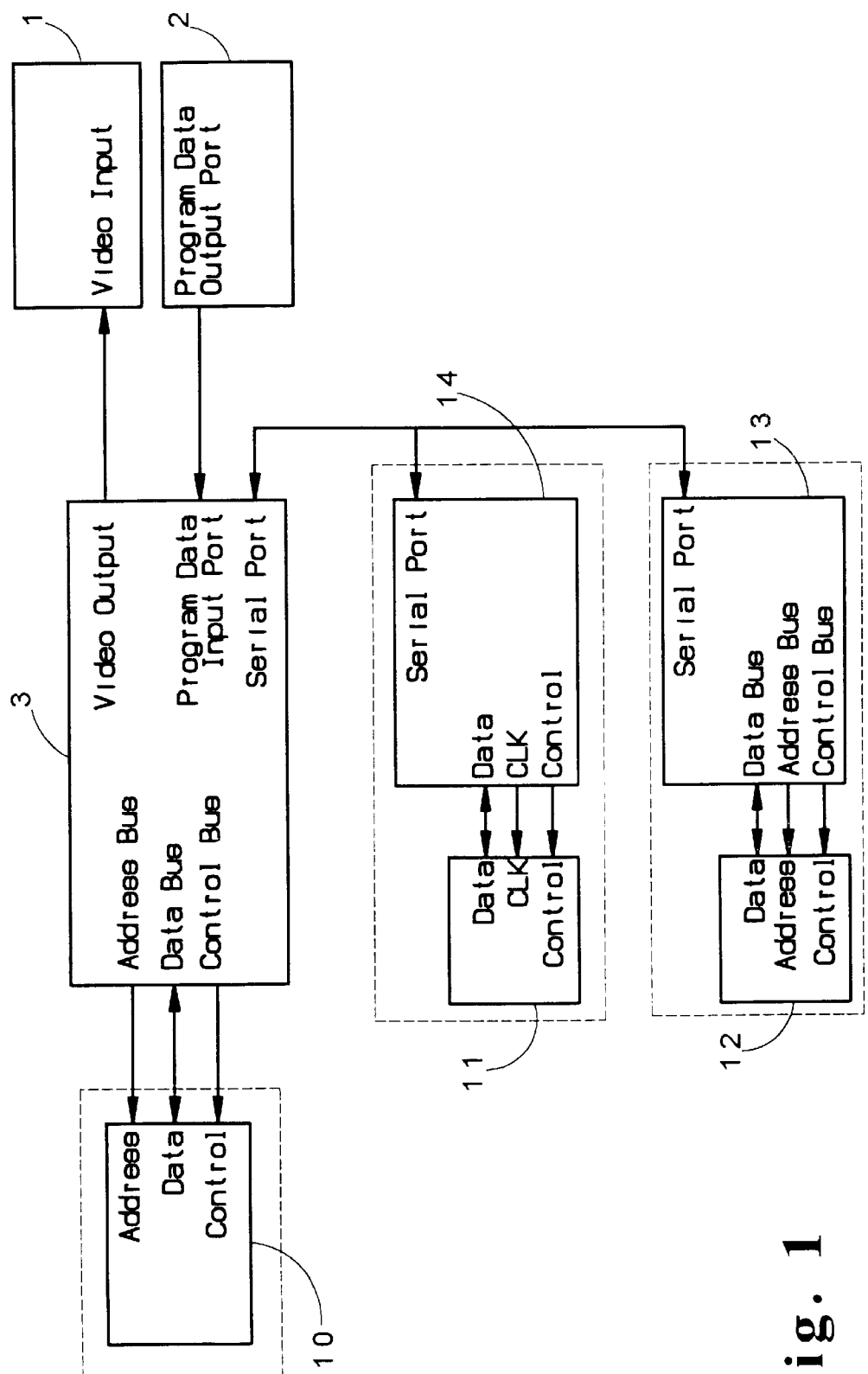
FIG. 1 is the block diagram of the prior art layout of a game player connecting with a memory card, a television set (or a monitor) and a CD-ROM drive.

FIG. 1 shows the block diagram of the prior art connection layout of a game player, a memory card, a television (or a monitor), and a CD-ROM drive. Prior art game player 3 can read program data from the CD-ROM drive's program data output port, and process the data before outputting it to the video image input port of the television (or monitor) 1. As each maker has its own system design, the connection facility to the memory card varies. For example, the SS game player 3 connects directly to the memory card 10, and the data interface is based on parallel-to-parallel communication; the PS game player 3 also connects directly to the memory card 11, and the game player 3 and the memory card 11 are serially interfaced through the connection to a memory controller card 14, and the data interface is based on serial communication; the N-64 game player 3 interfaces serially with a pad controller or joy-stick controller 13, in which is inserted a memory card 12 that interfaces with it in parallel.

Figure 2:
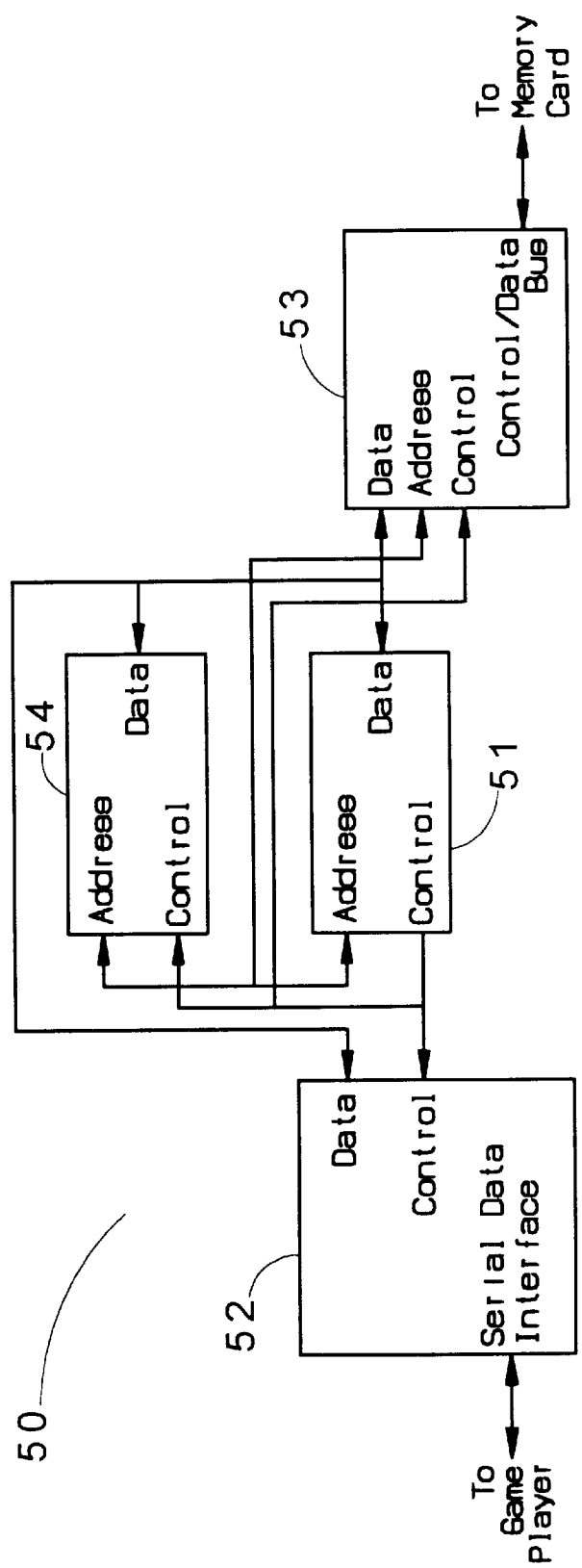
FIG. 2 is the block diagram of the first embodiment of the DTD of the present invention.

Referring next to FIG. 2 which shows the block diagram of the first embodiment of the DTD, the DTD 50 comprises primarily a data processing unit 51, a serial data interface unit 52, a serial/parallel data interface unit 53, and a data buffer unit 54; wherein the serial data interface unit 52, controlled by the data processing unit 51, can communicate by serial interface with the game player 3 to transmit data back to the data processing unit 51. The data processing unit 51 can perform computations on the input data and store the results in the data buffer unit 54, and control the serial/parallel data interface 53 to read/write data from/to the memory card in series or in parallel.

The data flow of DTD 50 of the present invention can serially read out the data from the game player 3 and the data then transmits game player 3 to the data processing unit 51, and then by serial or parallel interface (depending on the memory chips in the memory cartridge) said data is stored in the memory; or alternatively, the data processing unit 51 reads back the record data serially or in parallel from the memory card and said data is outputted serially to the game player 3. In this process, if the DTD 50 and the memory card communicate data in series, then the control/data bus of the serial/parallel data interface unit 53 will contain signals for timing, line-selection, and data; alternatively, if data are communicated in parallel, then control/data bus of the serial/parallel data interface unit 53 will contain read, write, data, and address signals, and the signal control part of the control/data bus of the serial/parallel data interface unit 53 will contain signals for timing, line-selection, and read/write, and further applications depending on the memory chip used in the memory card.

Furthermore, when the DTD 50 reads data from the game player 3, the operations performed by the data processing unit 51 include data-compression which uses known data-compression algorithms such as the Human algorithm that encodes numbering repeated characters, and subsequent storage of the compressed data in the memory through the serial/parallel data interface unit 53; and when the DTD 50 retrieves data from the memory, the operations performed by the data processing unit 51 include data-decompression which de-compresses retrieved data according to the prior compression algorithm, and subsequent transmission of data to the game player 3 through the serial data interface unit 52.

In addition to executing the data compression and de-compression operations, the data processing unit 51 of the DTD 50 converts data to a serial or parallel mode of communication, depending on the type of interface available on the externally connected memory card. The data processing unit 51 can be a microprocessor, a single-chip controller or a digital control circuit.

Figure 3:
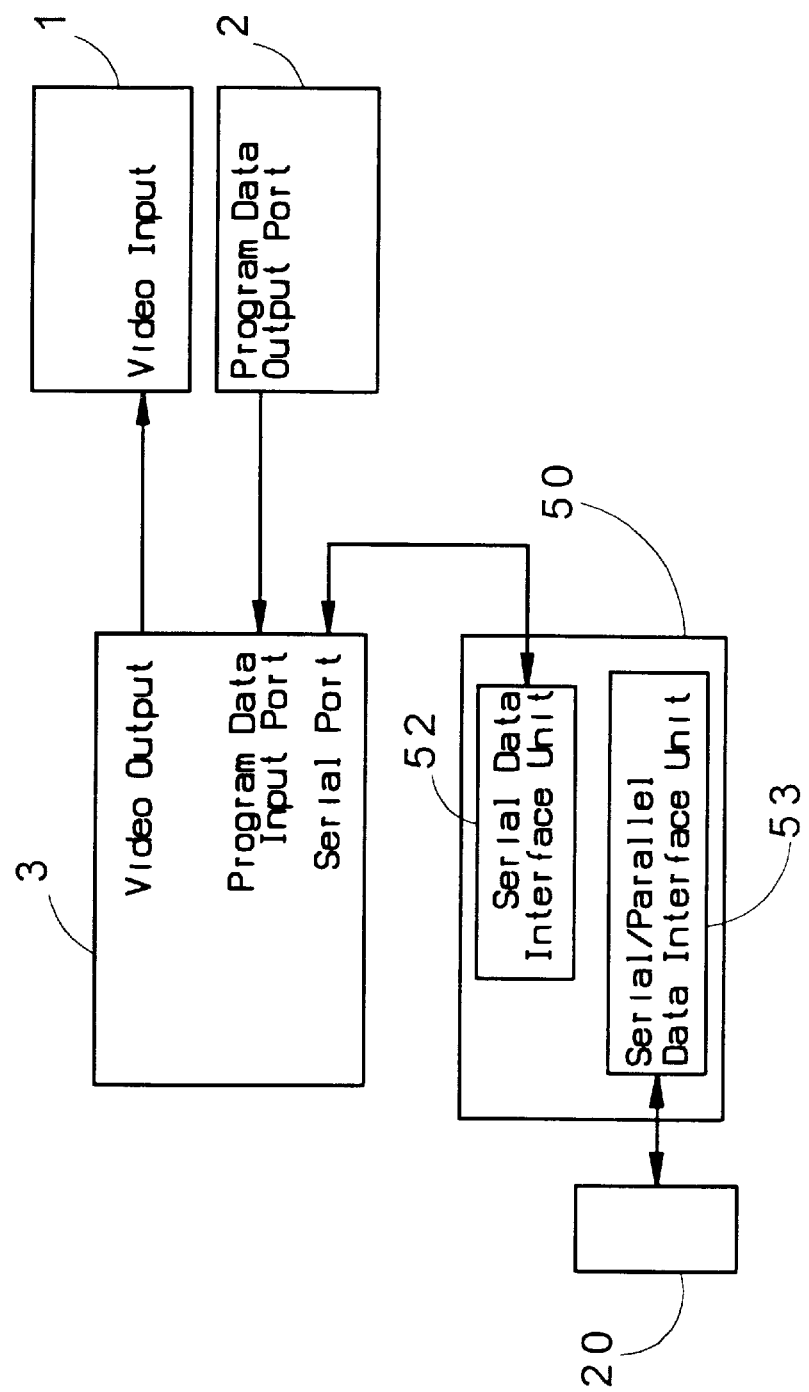
FIG. 3 is the block diagram that shows the DTD of FIG. 2 connecting with a game player and a memory card.

FIG. 3 shows the block diagram of the connection layout consisting of the DTD 50, a game player, and a memory card. This particular application is based on the PS game player 3. Please refer to FIG. 4 in conjunction with FIG. 1. In the prior art, the memory card 11 serially connects with the game player 3 through the use of a memory card controller 14; now the user can use the DTD 50 and insert it into the same memory card slot, and it connects serially with game player 3 through the serial interface unit 52. As such, users can use a non-PS memory card 20 for greater memory capacity.

In addition, said DTD can be equipped with a switch (not shown) for selecting which memory bank within the larger memory capacity to use for data storage. When the memory card 20 communicates in parallel with the DTD 50, the operate can switch to address signals for higher bits so as to use a larger memory bank.

Figure 4:
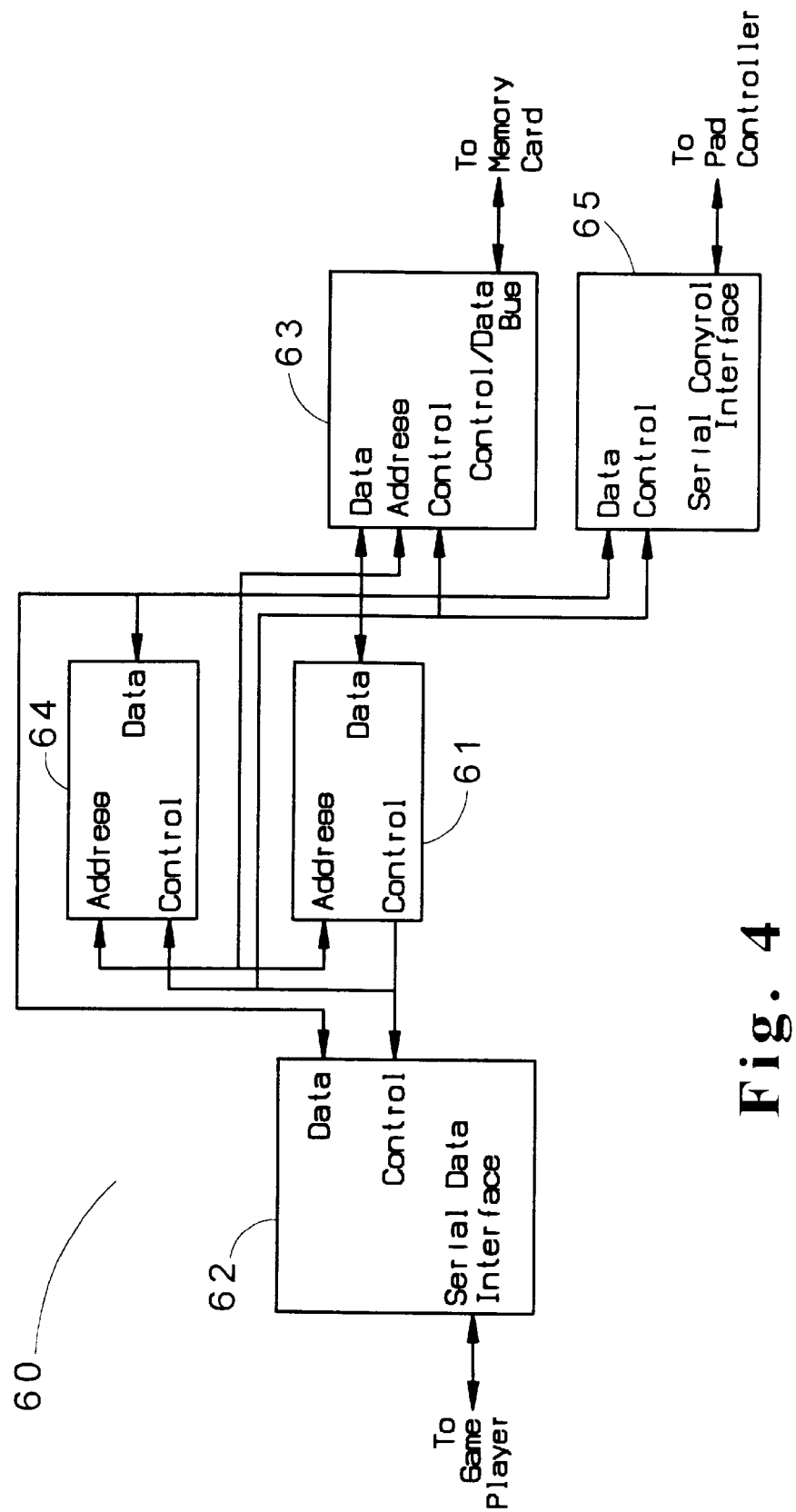
FIG. 4 is the block diagram of the second embodiment of the DTD of the present invention.

FIG. 4 shows the block diagram of the second embodiment of the DTD of the present invention. The DTD 60 comprises primarily a data processing unit 61, serial data interface unit 62, serial/parallel data interface unit 63, a data buffer unit 64, and a serial control interface unit 65; wherein the data processing unit 61, the serial data interface unit 62, the serial/parallel data interface 63, and the data buffer unit 64 are the same as those in the DTD 50 of the first embodiment, as well as having identical connections and functions, therewith (so the descriptions there of which are omitted here). The difference between these two embodiments is in the DTD 60's having the serial control interface unit 65, which acts as a communication conduit between the DTD 60 and the pad controller 13 (see FIG. 5), and which is controlled by the data processing unit 61 such that it can either read data signals from the pad controller 13 or output signals sent by the game player 3 to the pad controller 13.

The data flow of the DTD 60 is as follows: the game player 3 reads serial data to data processing unit 61, and said serial data includes record data and control data; the data processing unit 61 can perform the data compression algorithm of the first embodiment to compress record data and then store it in the memory either through a serial or parallel interface. A part of the control data transmitted from the game player 3 to the pad controller 13 will be intercepted regarding read signal and write signal for the memory by the data processing unit 61, and the remaining part will go to the pad controller 13 through the serial control interface unit 65. As such, pad controller 13 will not perform the task of retrieving and storing data to the memory, as the task will be performed by the DTD 60 of the present invention instead. As the pad controller 13 gives the command for downloading record data in the memory to the game player 3, the DTD 60 will intercept the controlling signals through the serial control interface unit 65, and notify game player 3 in stead of the pad controller 13, and read record data from the memory either in series or in parallel to the data processing unit 61 for data de-compression, after which operation data then flows to the system unit through the serial data interface unit 62.

In addition, the DTD 60 can define the key-press control status of the pad controller 13, which definition can be read in by the data processing unit 61 for executing the switching operation to switch between the memory banks of the memory card, or to perform signal indication; such signals of the definition of the key-press control status can be intercepted by the DTD 60 and will not go into the game player 3.

Figure 5:
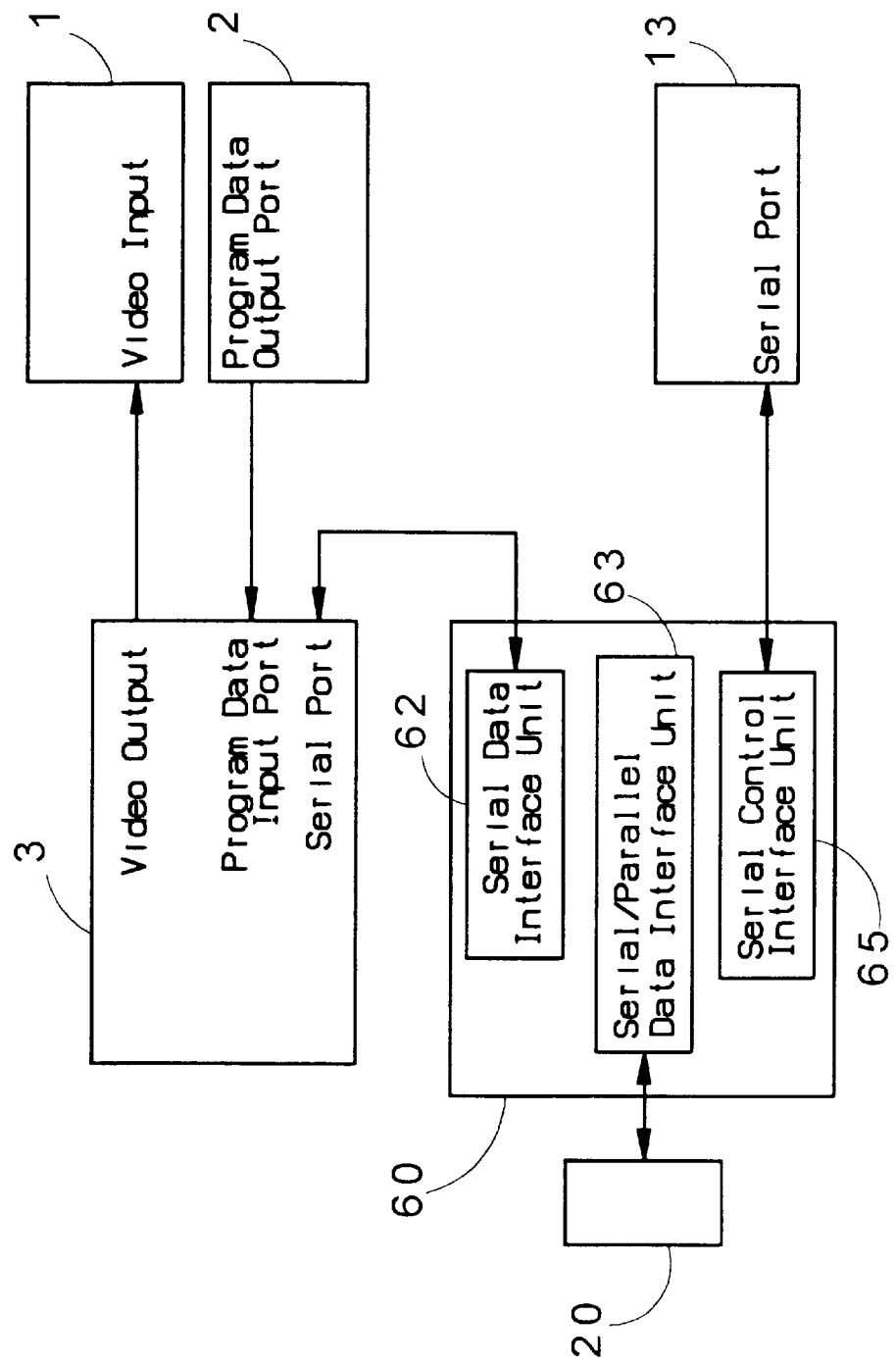
FIG. 5 is the block diagram that shows the DTD of FIG. 4 connecting with a game player, a memory card and a pad controller.

FIG. 5 shows the block diagram of the layout of the DTD 60, the game player 3, the memory card 20, and the pad controller 13. This embodiment uses the N-64 game player 3 as an example. Please refer hereto in conjunction with FIG. 1. In the prior art, the memory card 12 inserts directly into the pad controller 13, but now, users may use the DTD 60 as a communication conduit between the game player 3 and the pad controller 13, and it can effectively intercept the signals for data retrieval from and data storage to memory from both sides, and perform the task of data access in lieu of the pad controller 13; as a result, the user can use the non-(N-64) memory card 20 for greater memory capacity.

Figure 6:
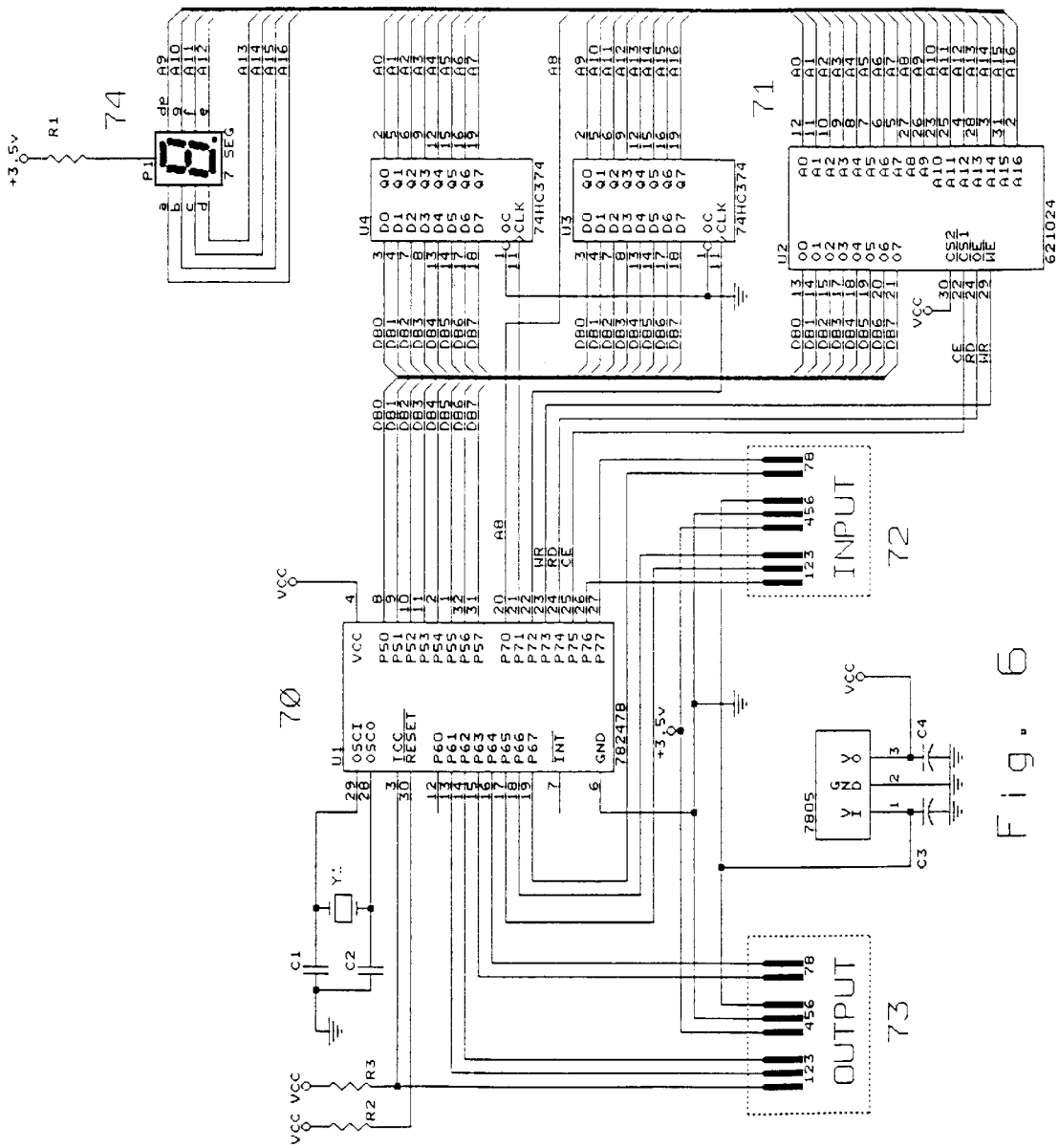
FIG. 6 shows the circuit diagram of the preferred embodiment of the DTD.

FIG. 6 shows the circuit diagram of the preferred embodiment of the present invention. This embodiment comprises primarily a data processing unit, whose constitution can be accomplished by a single chip processor 70, and a data buffer unit, whose constitution can be accomplished by a memory chip 71. The processor 70 incorporates programming input/output interfaces, including a serial data interface port for communicating, and interfaces in series with the game player and the pad controller (not shown); and memory data interface port which for communicating either serially or in parallel with the memory card (not shown). The signals of DTD to connect to the game player are connected to the input port 72, and the signals thereof to connect to the memory card and pad controller are connected to the output port 73. Furthermore, the monitor 74 can indicate the location of the memory bank switched to by the pad controller.

In the embodiment of the DTD 60, and the DTD 50 of the present invention, the non-specific memory card 20 can enable the use of the SS memory card with higher memory capacity (see Table 1) in conjunction with the PS or N-64 game players, or the PS memory card in the N-64 game player. Furthermore, higher capacity memories used by digital cameras, such as serial flash memories, and any other erasable memories, can all be used for this purpose.

The Effect of the Present Invention

The data-transfer device of the present invention can effectively overcome the problem of incompatibility which currently exists among memory cards designed specifically for their corresponding entertainment systems, and to provide for an effective means for the game player to use higher capacity memories thereby enabling the user to remove the restriction of using only a specific memory card for achieving greater economic utilities.

What is claimed is:

1. A data-transfer device to render a memory card compatible with a specific game player with which said memory card is normally incompatible, said data-transfer device comprising:
   (a) a serial data interface unit for communicating with said specific game player in series;
   (b) a memory port interface unit for communicating with said memory card;
   (c) a data processing unit, for processing record data read by said serial data interface unit and output to said memory port interface unit, and for processing record data read in by said memory port interface unit and output to said serial data interface unit; and
   (d) a data buffer unit, for providing data storage of said data processing unit.

2. A data-transfer device to render a memory card compatible with the pad controller of a specific game player with which said memory card is normally incompatible, said data-transfer device comprising:
   (a) a serial data interface unit for communicating with said specific game player in series;
   (b) a memory port interface unit for communicating with the game player;
   (c) a serial control interface unit for communicating with the pad controller in series;
   (d) a data processing unit, for separating record data and control data both read in from said serial data interface unit, such that record data output to said memory port interface unit, and for controlling said serial control interface unit in transmitting control data, and for processing record data read by said memory port interface unit and output to said serial data interface unit; and
   (e) a data buffer unit, for providing data storage of said data processing unit.

3. A data-transfer device to render a non-specific memory card compatible with a specific game player with which said memory card is normally incompatible, said data-transfer device comprising:
   (a) a data processing unit, for processing record data read from said specific game player and output to said memory card, and for processing record data read from said memory card and output to said specific game player; and
   (b) a data buffer unit, for providing data storage of said data processing unit; and
   said data processing unit having serial data interface port for communicating with said specific game player in series, and memory data interface port for communicating with said memory card.

4. The data-transfer device according to claim 1, wherein said memory port interface unit communicates with said memory card in series or in parallel transmission.

5. The data-transfer device according to claim 2, wherein said memory port interface unit communicates with the memory card in series or in parallel transmission.

6. The data-transfer device according to claim 3, wherein said memory data interface port of said data processing unit communicates with the memory card in series or in parallel transmission.

7. The data-transfer device according to claim 1, wherein said data processing unit is a microprocessor.

8. The data-transfer device according to claim 2, wherein said data processing unit is a microprocessor.

9. The data-transfer device according to claim 3, wherein said data processing unit is a microprocessor.

10. The data-transfer device according to claim 1, wherein said data processing unit is a digital control circuit.

11. The data-transfer device according to claim 2, wherein said data processing unit is a digital control circuit.

12. The data-transfer device according to claim 3, wherein said data processing unit is a digital control circuit.

13. The data-transfer device according to claim 2, wherein the control data transmitted by said serial control interface unit does not include signals for reading from or writing to the memory card.

14. The data-transfer device according to claim 2, wherein said data processing unit intercepts the control data of the pad controller for switching the memory banks in the memory card.

15. The data-transfer device according to claim 1, further comprises a switch for switching the memory banks in the memory card.

16. The data-transfer device according to claim 3, further comprises a switch for switching the memory banks in the memory card.

17. The data-transfer device according to claim 1, wherein said data processing unit processes record data read by said serial data interface unit with the operations of data compression and outputs them to said memory port interface unit, and processes record data read by said memory port interface unit with the operations of data decompression and outputs them to said serial data interface unit.

18. The data-transfer device according to claim 2, wherein said data processing unit processes record data read by said serial data interface unit with the operations of data compression and outputs them to said memory port interface unit, and processes record data read by said memory port interface unit with the operations of data decompression and outputs them to said serial data interface unit.

19. The data-transfer device according to claim 3, wherein said data processing unit processes record data read by said serial data interface unit with the operations of data compression and outputs them to said memory port interface unit, and processes record data read by said memory port interface unit with the operations of data decompression and outputs them to said serial data interface unit.

20. The data-transfer device according to claim 3, wherein a part of the signals of said serial data interface port are communicated with a pad controller by serial transmission.

* * * * *